(12) United States Patent
Bouillon et al.

(10) Patent No.: US 9,365,144 B2
(45) Date of Patent: Jun. 14, 2016

(54) VEHICLE FOOT-REST

(75) Inventors: Jean-Charles Bouillon, La Queue Lez Yvelines (FR); Nathalie Coco, Voisins le Bretonneux (FR)

(73) Assignee: RENAULT s.a.s., Boulogne Billancourt (FR)

( * ) Notice: Subject to any disclaimer, the term of this patent is extended or adjusted under 35 U.S.C. 154(b) by 53 days.

(21) Appl. No.: 14/352,466

(22) PCT Filed: Sep. 11, 2012

(86) PCT No.: PCT/FR2012/052020
§ 371 (c)(1),
(2), (4) Date: Apr. 23, 2014

(87) PCT Pub. No.: WO2013/057397
PCT Pub. Date: Apr. 25, 2013

(65) Prior Publication Data
US 2014/0292017 A1    Oct. 2, 2014

(51) Int. Cl.
*B60N 3/06* (2006.01)
*B60R 11/06* (2006.01)
*B60R 7/04* (2006.01)
*B60R 11/00* (2006.01)

(52) U.S. Cl.
CPC ... *B60N 3/06* (2013.01); *B60R 7/04* (2013.01); *B60R 11/06* (2013.01); *B60R 2011/0029* (2013.01)

(58) Field of Classification Search
CPC .................................................. B60N 3/06
USPC ............................................................ 296/75
See application file for complete search history.

(56) References Cited

U.S. PATENT DOCUMENTS

| 1,252,775 | A | * | 1/1918 | Butcher | 220/8 |
| 2,341,080 | A | * | 2/1944 | Burkholder | 297/423.46 |
| 2,654,420 | A | * | 10/1953 | Rogers | 296/75 |
| 2,862,761 | A | * | 12/1958 | Scheidegger | 296/75 |
| 6,283,529 | B2 | * | 9/2001 | Kitagawa | 296/75 |

(Continued)

FOREIGN PATENT DOCUMENTS

| DE | 102008004885 A1 | * | 7/2009 |
| EP | 2 241 474 A1 | | 10/2010 |
| FR | 2 910 404 | | 6/2008 |

OTHER PUBLICATIONS

International Search Report issued Oct. 24, 2012, in PCT/FR12/052020 filed Sep. 11, 2012.

*Primary Examiner* — H Gutman
(74) *Attorney, Agent, or Firm* — Oblon, McClelland, Maier & Neustadt, L.L.P.

(57) ABSTRACT

A foot-rest for a motor vehicle including a support surface facing at least part of which a sound insulation mat can be extended, mounted on the floor of the motor vehicle, including an insulating layer interposed between the floor and a coating layer mounted on the insulating layer, the foot-rest further including a storage compartment. The support surface includes an inner face configured to be positioned facing an outer face of the coating layer, the inner face being including links configured to support the storage compartment such that an inner volume of the storage compartment extends between the inner face of the support surface and the outer face of the coating layer.

10 Claims, 2 Drawing Sheets

(56) References Cited

U.S. PATENT DOCUMENTS

| | | | |
|---|---|---|---|
| 6,502,905 B2 * | 1/2003 | Cheris et al. | 297/423.46 |
| 7,055,893 B2 * | 6/2006 | Yamamura et al. | 296/187.08 |
| 9,022,451 B2 * | 5/2015 | Ikeno et al. | 296/75 |
| 2010/0263469 A1 | 10/2010 | Ohtsubo et al. | |

* cited by examiner

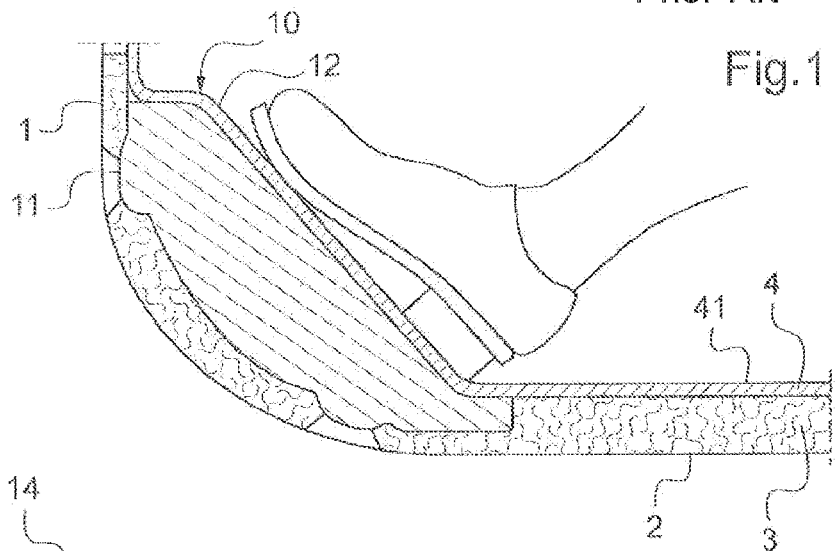
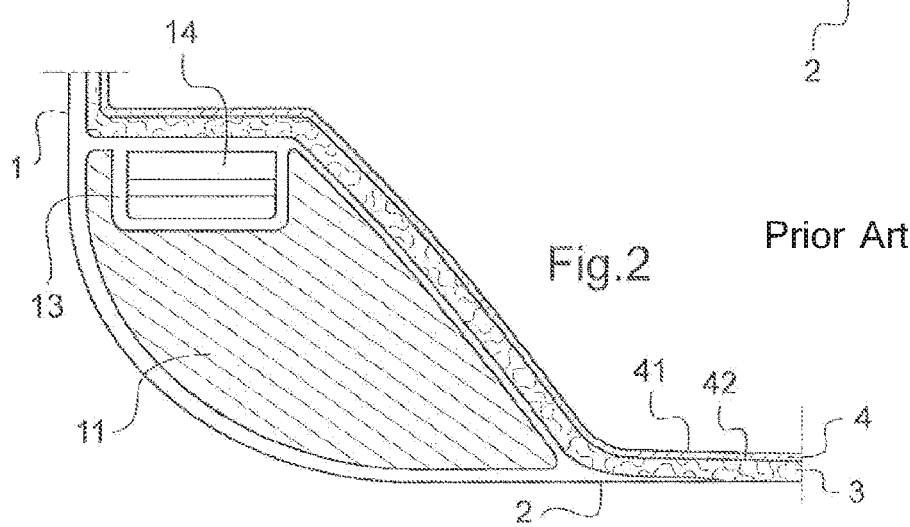
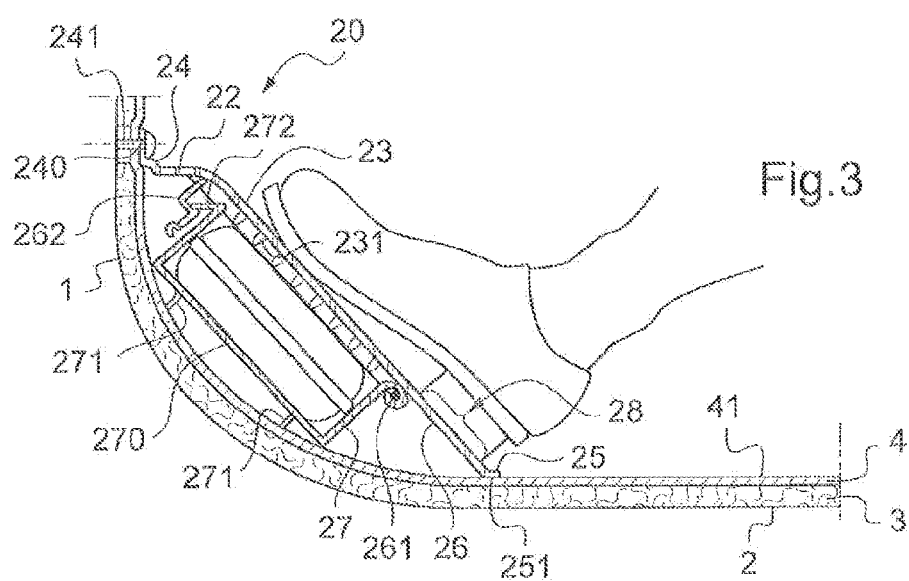

VEHICLE FOOT-REST

BACKGROUND

The present invention relates to a footrest intended to be fitted between part of a front body panel and a floor of a vehicle, particularly a motor vehicle, comprising an element acting as a support provided with a support surface adapted to receive the foot or feet of a motor vehicle passenger, facing at least part of which surface a sound insulation mat can be laid, mounted on the floor of the motor vehicle, said sound insulation mat comprising an insulating layer interposed between the floor and a covering layer mounted on said insulating layer having an outer face formed from a carpet-type textile, said element acting as a support, moreover comprising at least one storage compartment.

A footrest device already known to the person skilled in the art is illustrated in FIG. 1. For greater postural comfort, a footrest 10 is generally fitted between part of a front body panel 1 and a floor 2 of the vehicle within the vehicle interior and comprises a shim 11 in a thermoplastic material (PSE or PPE) created by molding, integrated level with an insulating layer 3 of acoustic foam intended to provide sound insulation, mounted on the floor 2 of the vehicle, the assembly being covered with a covering layer 4 allowing the aesthetic constraints imposed to be observed, having an outer face 41 formed by a carpet-type textile. The shim 11 thereby integrated in the insulating layer 3 comprises a rigid planar part 12 intended to receive the passenger's foot, this being disposed in an inclined fashion towards the front of the vehicle at a predetermined angle relative to the floor.

As illustrated in FIG. 2, it is moreover known for a footrest device of this kind to be modified to incorporate a storage compartment intended to store a tire repair kit for the motor vehicle. To achieve this, the shim 11 fitted between the part of the front body panel 1 and the floor 2 is provided with a cavity 13 made in the internal space of the shim, in the upper part thereof, forming a housing suitable for receiving a tire repair kit 14 typically made up of a compressor and a reservoir of sealing product. The shim 11 is covered with the covering layer 4 which may be acoustically treated by adding to it an insulating layer 3 of acoustic felt, for example, directly mounted on the lower face 42 of the covering layer 4.

Also, in order to access the internal storage space incorporated in the footrest device, it is necessary to remove the textile covering layer covering the assembly beforehand. This is an inconvenient, laborious operation to carry out. Moreover, the fitting of this device in the vehicle is relatively complex, to the extent that the shim acting as the footrest is intended to be fitted beneath the insulating layer. Moreover, since the volume of the PPE shim 11 is quite considerable, the manufacturing cost is increased.

BRIEF SUMMARY

In this context, the aim of the invention is to propose a footrest incorporating a storage space which is easy to fit in a vehicle and which allows easy access to the storage space if required.

To this end, the footrest in the invention, moreover in accordance with the generic definition thereof given in the preamble above, is essentially characterized in that said support surface comprises an inner face intended to be positioned facing an outer face of said covering layer during fitting of the footrest, said inner face being provided with linkage elements designed to support said storage compartment, such that the internal space of said storage compartment extends between said inner face of said support surface and said outer face of said covering layer.

An advantageous embodiment envisages that said element acting as a support comprises a rigid planar baseplate designed to be connected at its upper end to the front body panel part by at least one fixed detachable link, whereas its lower end comprises a support area intended to be positioned in a freely supported manner in relation to the floor, such that said support surface is shown inclined towards the front of the vehicle at a given inclination.

Said linkage elements are advantageously designed to allow a mobile assembly of said storage compartment with said inner face of said support surface according to a first configuration in which said storage compartment is closed by said inner face of said support surface and a second configuration in which said internal space of said storage compartment is made accessible.

Said linkage elements preferably comprise locking means suitable for cooperating with corresponding means of the storage compartment, in order to lock said storage compartment in said first configuration.

According to one embodiment, said linkage elements comprise means forming a pivot which enable said storage compartment to be connected to said inner face of said support surface, so as to constitute a pivot link capable of guiding said storage compartment rotationally about a linkage axis significantly parallel to said inner face of said support surface.

Said storage compartment advantageously comprises a bottom part opposite said inner face of said support surface, said bottom part comprising at least one support foot intended to rest on the outer face of said covering layer when the footrest is fitted.

Said support surface of said element acting as a support preferably comprises a series of substantially parallel ribs.

Said support surface of said element acting as a support advantageously comprises a lower area free from said ribs.

According to one embodiment, said storage compartment comprises a rigid casing molded according to at least one form enabling a tire repair kit for the motor vehicle to be received.

Said rigid casing preferably comprises a first form capable of receiving a compressor and a second form capable of receiving a reservoir containing a sealing product.

BRIEF DESCRIPTION OF THE DRAWINGS

Other characteristics and advantages of the invention will clearly emerge from the description given below by way of illustration without having any limiting force with reference to the attached drawings in which:

FIGS. 1 and 2 illustrate schematically footrest devices from the prior art which have already been described;

FIG. 3 illustrates schematically a footrest according to the invention;

DETAILED DESCRIPTION

Figure 4:
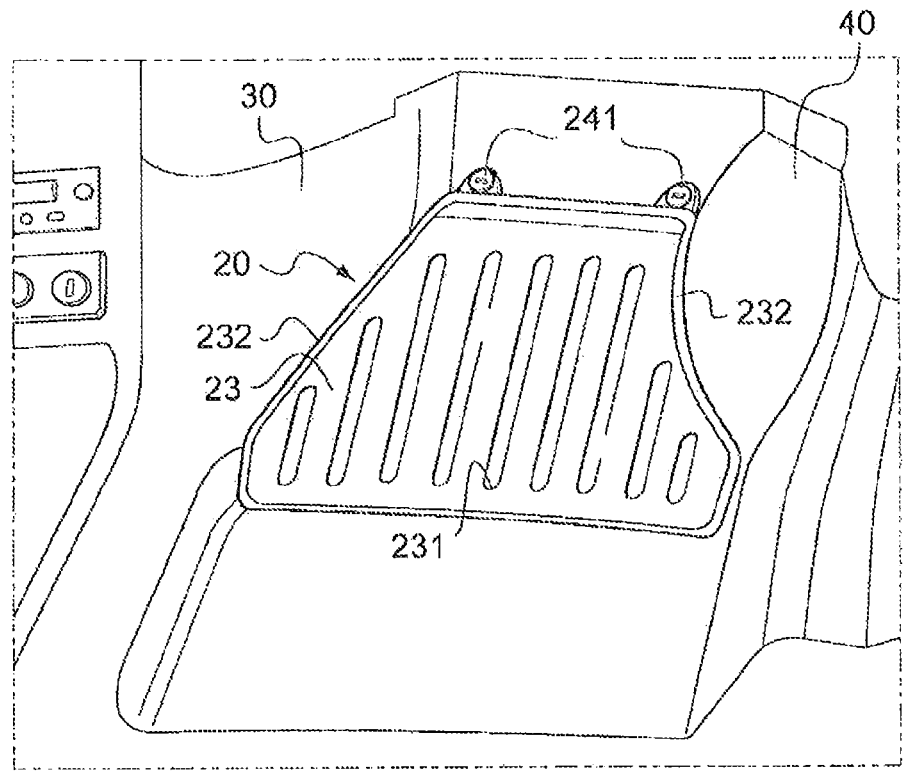
FIG. 4 illustrates a perspective view from above of the footrest according to the invention in its fitting position in the interior of the motor vehicle and FIG. 5 illustrates a perspective view from below of the footrest according to the invention.

As illustrated in FIG. 3, the footrest 20 according to the invention is intended to be completely separate from the insulating layer 3. The latter may also be processed in a simplified manner, by mounting a 20 mm thick felt layer, for example, directly on the floor to act as a sound absorber, said layer therefore being interposed between the floor 2 and the covering layer 4 mounted on said insulating layer, having an outer face 41 formed from a carpet-like textile.

The footrest 20 according to the invention is, moreover, intended to be fitted by being arranged directly on the covering layer 4 and is designed to be able to be assembled and dismantled from this fitting position very easily. To achieve this, it takes the form of a rigid planar baseplate 22 realized in plastic material, for example, a support surface 23 of which is intended to receive the foot or feet of the passenger of the motor vehicle. The rigid planar baseplate 22 is provided to be attached level with its upper end 24 to the part of the front body panel 1 by at least one fixed detachable link. According to the exemplary embodiment illustrated in FIGS. 3 to 5, in order to achieve this the baseplate comprises at its upper end 24 openings 240 adapted to receive detachable mechanical fixing means 241 to part of the front body panel 1, such as maintenance clips fixed on studs welded to the part of the front body panel 1, which pass through the covering layer 4 and the insulating layer 3. The rigid planar baseplate 22 moreover comprises in its lower end 25 a support zone 251 intended to be positioned in a freely supported manner in relation to the floor 2.

Fitted in this manner between part of the front body panel 1 and the floor 2 of the vehicle, the baseplate 22 is disposed such that the support surface 23 is inclined towards the front of the vehicle on a given incline and an inner face 26 of the support surface 23 is positioned facing the outer face 41 of the covering layer 4. A space thereby remains available, said space extending between the inner face 26 of the support surface 23 of the footrest and the outer face 41 of the covering layer 4. In order to be able to arrange this available space, the inner face 26 of the support surface 23 is provided with linkage elements 261, 262, specified below, which are designed to support a storage compartment 27, such that the internal space of the storage compartment 27 extends between the inner face 26 of the support surface 23 and the outer face 41 of the covering layer 4. The storage compartment 27 particularly comprises a bottom part 270 opposite the inner face 26 of the support surface 23, on which support feet 271 may be arranged, provided to rest on the outer face 41 of the covering layer 4 during the fitting of the footrest 20.

In the embodiment described, the storage compartment 27 is realized in the form of a rigid casing molded in such a manner as to be able to receive a tire repair kit for the motor vehicle. In particular, the rigid casing comprises a first form 273 designed to receive a compressor and a second form 274 designed to receive a reservoir containing a sealing product.

More precisely, the linkage elements 261, 262 of the inner face 26 of the support surface 23 with the storage compartment 27 are designed to allow mobile assembly of these elements according to a first configuration in which the storage compartment 27 is closed by the inner face 26 of the support surface 23 (corresponding to the configuration illustrated in FIGS. 3 and 5) and a second configuration in which the internal volume of the storage compartment 27 is made accessible.

To achieve this, the linkage elements with which the inner face 26 of the support surface 23 is equipped comprise assembly means of a nature articulated about a hinge axis comprising means forming a pivot 261, through which the storage compartment 27 is linked to the inner face 26 of the support surface 23, and allowing the storage compartment 27 to pivot about an axis X-X significantly parallel to the inner face 26 of the support surface 23 and thereby ensure the switching of the storage compartment 27 from one configuration to the other.

Moreover, the linkage elements with which the inner face 26 of the support surface 23 is equipped comprise locking means 262 capable of cooperating by clipping, for example, with corresponding means 272 of the storage compartment 27, in order to lock the storage compartment in the first configuration, in which the storage compartment 27 is closed by the inner face 26 of the support surface 23. The locking means 262 take the shape of a hooking element, for example, disposed on the inner face 26 of the support surface 23, in which a corresponding elastic element 272 supported by the storage compartment 27 can become hooked in a detachable manner.

Access to the storage compartment 27 incorporated in the footrest 20 according to the invention is made very easy, insofar as it simply requires the detachable mechanical fixing means 241 connecting the footrest 20 to part of the front body panel 1 to be dismantled, in order to gain access to the rear of the footrest 20 where the storage compartment 27 is housed, without it being necessary to handle the carpet-type covering layer 4.

The rigid planar baseplate 22 further comprises in its planar part made up of the support surface 23 a first series of longitudinal or transverse stiffening ribs 231, running significantly parallel, to receive the foot in a comfortable manner. However, a lower area 28 of the support surface 23 intended to receive more specifically the heel of the passenger's foot is free from stiffening ribs of this kind, in order to limit the resistance of this area in the event of a collision to reduce the risk of possible injuries to the passenger's ankle. In a variant not shown, the part of the inner face 26 facing the lower area 28 may comprise a second series of ribs which are finer than the ribs 231, such that they are adapted to a possible collision.

Figure 5:
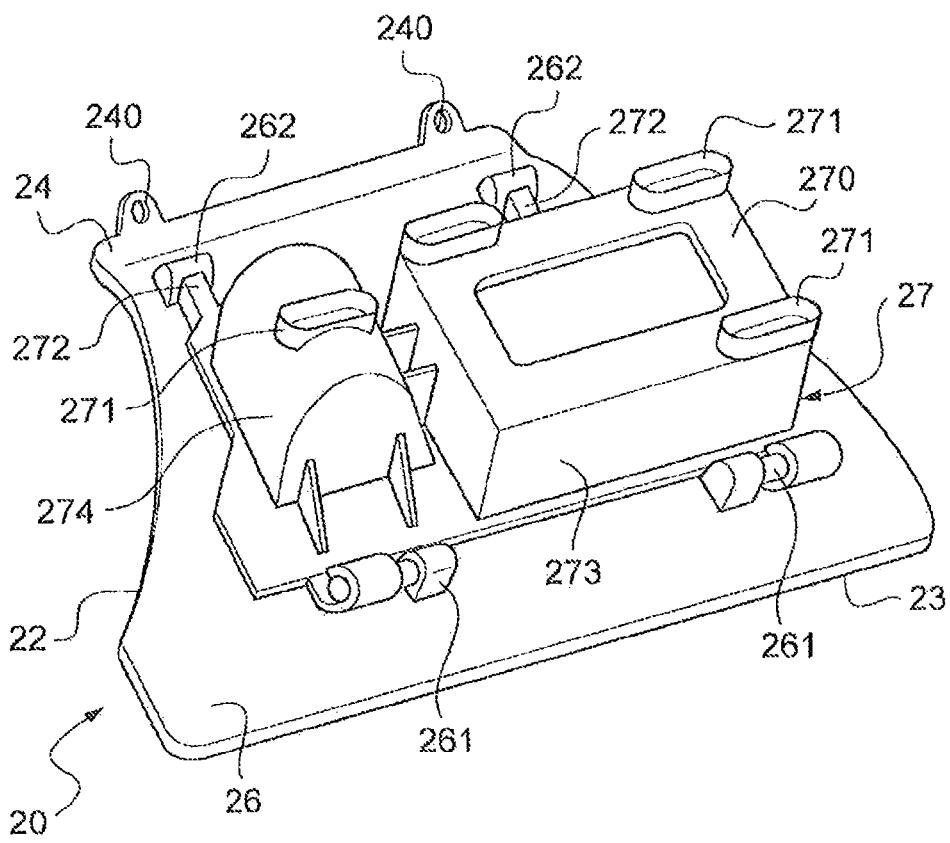

As illustrated in greater detail in FIG. 4, the shape of the rigid planar baseplate 22 is adapted such that when the footrest is fitted in the interior, as explained above, the lateral edges 232 of the support surface 23 closely match the raised area of the side 30 of the central console of the motor vehicle on one side and the raised area of the wheel arch 40 on the other.

The support surface 23 of the footrest may be covered with a carpet-type upholstery covering, on the one hand for passenger comfort and, on the other, out of aesthetic considerations, for the purpose of achieving an appearance which is consistent with the covering layer 4 at vehicle floor level.

The support surface 23 may also be quite simply grained and exhibit raised patterns, which allows costs to be reduced but likewise a weight advantage to be achieved.

The invention claimed is:

1. A footrest configured to be fitted between part of a front body panel and a floor of a motor vehicle, comprising:
   an element acting as a support including a support surface configured to receive a foot or feet of a motor vehicle passenger, facing at least part of which surface a sound insulation mat can be laid, mounted on the floor of the motor vehicle,
   the sound insulation mat comprising an insulating layer interposed between the floor and a covering layer mounted on the insulating layer,
   the element acting as the support, and including at least one storage compartment, and
   wherein the support surface includes an inner face configured to be positioned facing an outer face of the covering layer during fitting of the footrest, the inner face including linkage elements configured to support the storage compartment, such that an internal space of the storage compartment extends between the inner face of the support surface and the outer face of the covering layer.

2. The footrest as claimed in claim 1, wherein the element acting as the support includes a rigid planar baseplate configured to be connected at its upper end to the front body panel by at least one fixed detachable link, whereas its lower end includes a support area configured to be positioned in a freely supported manner in relation to the floor, such that the support surface is inclined towards a front of the vehicle at a given inclination.

3. The footrest as claimed in claim 1, wherein the linkage elements are configured to allow a mobile assembly of the storage compartment with the inner face of the support surface according to a first configuration in which the storage compartment is closed by the inner face of the support surface and a second configuration in which the internal space of the storage compartment is made accessible.

4. The footrest as claimed in claim 3, wherein the linkage elements include locking means for cooperating with corresponding means of the storage compartment, to lock the storage compartment in the first configuration.

5. The footrest as claimed in claim 1, wherein the linkage elements include means forming a pivot that enable the storage compartment to be connected to the inner face of the support surface, to constitute a pivot link configured to guide the storage compartment rotationally about a linkage axis substantially parallel to the inner face of the support surface.

6. The footrest as claimed in claim 1, wherein the storage compartment includes a bottom part opposite the inner face of the support surface, the bottom part including at least one support foot configured to rest on the outer face of the covering layer when the footrest is fitted.

7. The footrest as claimed in claim 1, wherein the support surface of the element acting as the support includes a series of substantially parallel stiffening ribs.

8. The footrest as claimed in claim 7, wherein the support surface of the element acting as the support includes a lower area free from the stiffening ribs.

9. The footrest as claimed in claim 1, wherein the storage compartment includes a rigid casing molded according to at least one form configured to receive a tire repair kit for the motor vehicle.

10. The footrest as claimed in claim 9, wherein the rigid casing includes a first form configured to receive a compressor and a second form configured to receive a reservoir containing a sealing product.

* * * * *